US010264089B2

(12) United States Patent
Reddy et al.

(10) Patent No.: US 10,264,089 B2
(45) Date of Patent: Apr. 16, 2019

(54) RULE CONFIGURATION FRAMEWORK FOR COMMUNICATION PROTOCOLS

(71) Applicant: Verizon Patent and Licensing Inc., Arlington, VA (US)

(72) Inventors: Krishna Reddy, Irvine, CA (US); Rajesh Ranjan, Princeton, NJ (US); Enseart Alwyn Simpson, Somerset, NJ (US); Naveen Kumar Reddy Indurti, Irvine, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 790 days.

(21) Appl. No.: 14/588,071

(22) Filed: Dec. 31, 2014

(65) Prior Publication Data

US 2016/0191415 A1 Jun. 30, 2016

(51) Int. Cl.
*H04L 29/08* (2006.01)
*H04L 12/24* (2006.01)

(52) U.S. Cl.
CPC .......... *H04L 67/2819* (2013.01); *H04L 41/00* (2013.01); *H04L 67/00* (2013.01); *H04L 67/02* (2013.01)

(58) Field of Classification Search
CPC ..... H04L 67/2819; H04L 67/00; H04L 67/02; H04L 41/00
USPC ................................................. 709/224–226
See application file for complete search history.

(56) References Cited

U.S. PATENT DOCUMENTS

| | | | | |
|---|---|---|---|---|
| 6,393,477 B1* | 5/2002 | Paxhia | .................... | H04L 29/06 709/219 |
| 9,529,996 B2* | 12/2016 | Qureshi | .................. | G06F 21/53 |
| 2008/0297379 A1* | 12/2008 | Yang | ....................... | H03M 7/30 341/50 |
| 2011/0178973 A1* | 7/2011 | Lopez | .................... | G06N 5/025 706/48 |
| 2011/0209211 A1* | 8/2011 | Kuindersma | ........... | H04L 41/28 726/12 |
| 2011/0251992 A1* | 10/2011 | Bethlehem | .......... | H04L 12/2863 707/610 |
| 2012/0102160 A1* | 4/2012 | Breh | ..................... | G06F 9/5061 709/220 |
| 2013/0247169 A1* | 9/2013 | Harrison | ............. | H04L 63/0263 726/12 |
| 2013/0311593 A1* | 11/2013 | Prince | .................... | H04L 67/34 709/213 |
| 2015/0222563 A1* | 8/2015 | Burns | ..................... | G06F 3/122 709/226 |

(Continued)

*Primary Examiner* — Minh Chau Nguyen

(57) ABSTRACT

A system and method are provided for rule configuration for communication protocols. A set of rules associated with a plurality of network resources associated with a server is received at the server from another server. The set of rules is stored in a data storage associated with the server. A request is received at the server from a computing device, for accessing a network resource. One or more rules associated with the network resource are determined from the rules in the data storage. A mapping between the request and each of the one or more rules is determined. If the mapping provides one or more matches between one or more parameters of the request and the one or more rules, a modified request is generated based on the one or more matches. Access to the network resource is provided to the computing device based on the modified request.

18 Claims, 10 Drawing Sheets

(56) References Cited

U.S. PATENT DOCUMENTS

2015/0304354 A1* 10/2015 Rogers ............... H04L 63/0209
                                                         726/1
2016/0105317 A1*  4/2016 Zimmermann ....... G06F 9/4445
                                                         709/221

* cited by examiner

RULE CONFIGURATION FRAMEWORK FOR COMMUNICATION PROTOCOLS

BACKGROUND

Data communication via the World Wide Web enables computing devices to communicate with other devices. The communication among the devices normally takes place using communication protocols by the hosts (e.g., servers) that provide the communication network. For example, the Hypertext Transfer Protocol (HTTP) is a communication protocol that provides a foundation for the communication. Communication protocols are system of rules for data exchange among computing devices within communication networks. The rules of a communication protocol such as, for example HTTP, can be defined by rule configuration frameworks and can be used for defining various aspects of the protocol such as, for example, syntax, semantics, synchronization of communication, etc.

In addition, a communication server may be associated with several data centers and provide services to its customers based on data from the data centers. Each service request received at the server can be redirected, for example based on the data included in the request, to a data center providing response to the request. Each data center may have a different configuration with different configuration rules to map a request for data to a proper response data within the data center for responding the request. However, manual redirection of requests among data centers of a server is a process that consumes time and a high volume of memory space within the server.

Therefore, a need exists for a generic and server-independent rule configuration framework to automatically map a request received at a server, for example in form of a Uniform Resource Identifier (URI), to a data center that provides a response to the request.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
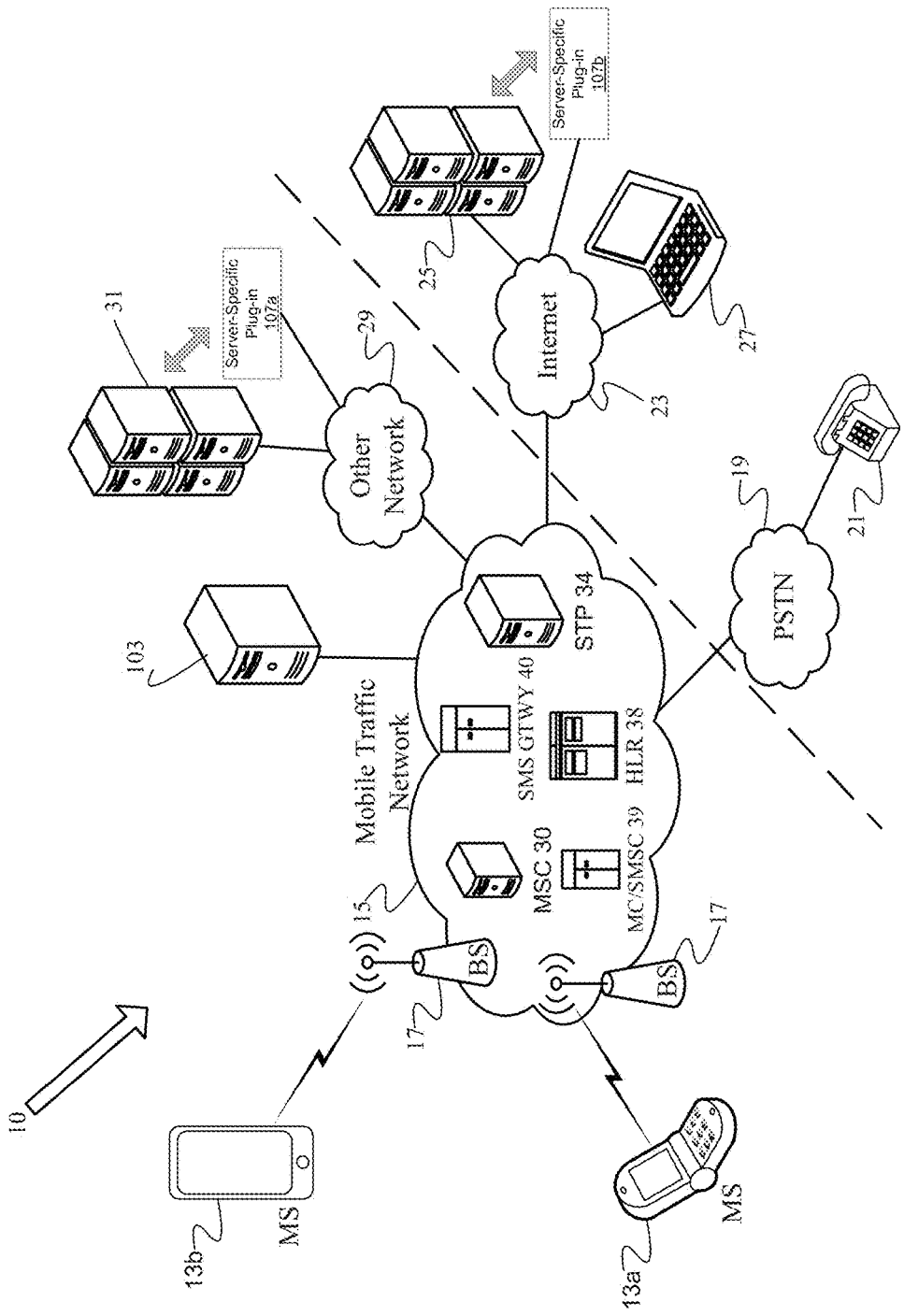
FIG. 1 is a high-level functional block diagram of an exemplary network that provides various communications for mobile devices and supports an example of the rule configuration for communication protocols, according to one implementation.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Data communication among computing devices is normally managed by severs using communication protocols. Communication protocols provide rules for data exchange among computing devices within a communication network. The rules of a communication protocol such as, for example HTTP, can be defined by rule configuration frameworks and can be used for defining various aspects of the communication protocol.

Typically, in communication technologies, rules are triggered when an incoming request from a client device is received at the server on a context that is mapped to a rule set. Upon being triggered, the server can evaluate the rule set against properties of the request. For each rule configured in the rule set, the server may evaluate all existing clauses that condition the rule for validity. If all the clauses are valid, the server may prepare a response to the request by applying all existing modifiers to alter the response structure and then send the response back to the client based on the modified response structure.

A request for accessing a resource may be received at a server from a client device as a URL. A URL may include multiple parameters as inputs to the server such that the server can obtain the requested resource and provide the resource to the client device using the input parameters. For example, the URL parameters may include name of a protocol used for transferring the resource over a network, name of a server hosting the resource, name of the resource, a path for accessing the resource, etc. A real URL including a complete path for accessing a resource may be a long string and inconvenient for a user to remember, to take note of, or to enter into a browser. For example, a real URL for accessing a resource named "resource1" may look like:

(1) http://aaa.bbbb.org/ccc/%D8%A7%D8%B3%D8%B7%D9%88%D8%AE%D9%88%D8%AF%D9%88%D8%B3.

However, the server providing the resource may assign a simplified URL to resource1 as: (2) http://aaa.bbbb.org/ccc/resource1.

In order to redirect request (2) received at the server to resource1 as provided by the real URL (1), the server stores a rule in a data store mapping URL (2) to URL (1). However, the server administrators may modify the real URL due to various technical, strategic or legal issues and with every change in the real URL (1) the rule mapping URL (2) to URL (1) should be updated to map the URL (2) to the correct resource. Since multiple servers may be involved with processing large numbers of resources and requests, the rule updates at every server can be a highly time and resource consuming task.

Therefore, a need exists for a rule configuration framework such that the rules can be configured and updated once, for example, at a rule configuration platform and each server can periodically obtain the updates from the configuration platform, store a local copy of the current rules, and apply the obtained rules from the local storage on requests received at the server. This may increase speed of implementing, testing, and deploying redirect rules. The rule configuration framework may also enable a client to implement protocol rules without having to rely on experts. This is due to the simplicity of the rule building process coupled with the security given by the constrained functionality of the framework's configurations.

The rule configuration platform can add a functionality of a server to another server having a different type, by accessing a plug-in API and a programming library with sufficient capabilities from the other server. A rule configuration platform can create a common environment for configuring the rules of a communication protocol across different implementations of the protocol servers. The rule configuration platform can achieve this goal, for example, by utilizing an agent resident within a server (e.g., a server-specific plug-in) to access formatted rule configurations from a centralized data store and translate the configurations into sets of logical triggers that can alter behavior of the server when certain conditions are met.

Reference now is made in detail to the examples illustrated in the accompanying drawings and discussed below. FIG. 1 is a high-level functional block diagram of an exemplary network 10 that provides various communications for mobile devices and supports an example of the rule configuration for communication protocols by a rule configuration platform 103, according to one implementation. The rule configuration platform 103 can provide rule configuration for services provided by application servers 31 or 25 to mobile devices 13a and 13b and the user terminals 27. The example shows simply two mobile devices 13a and 13b as well as a mobile communication network 15. The stations 13a and 13b are examples of mobile devices that may be used for accessing the services provided by the application servers 31 or 25 and the rule configuration services provided by the rule configuration platform 103. The user terminal 27 may also be used for accessing the services provided by the application servers 31 or 25 and the rule configuration services provided by the rule configuration platform 103. The rule configuration platform 103 can be located anywhere throughout the mobile communication network 10 and communicate with the application servers 25 and 31 via the communication network 15. In addition, each application server 31 or 25 can have a server-specific plug-in component (107a and 107b, respectively) for storing and processing rule configurations provided by the rule configuration platform 103.

Although two mobile devices are shown, the network provides similar communications for other users as well as for mobile devices/users that may not participate in the services. The network 15 provides mobile wireless communications services to those stations as well as to other mobile devices (not shown), for example, via a number of base stations (BSs) 17. The present techniques may be implemented in any of a variety of available mobile networks 15 and/or on any type of mobile device compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless Internet Protocol (IP) network standard or the Evolution Data Optimized (EVDO) standard, the Global System for Mobile (GSM) communication standard, a time division multiple access (TDMA) standard or other standards used for public mobile wireless communications. The mobile devices 13a and 13b may be capable of voice telephone communications through the network 15, and for accessing applications and services provided by application servers 31 and 25 and the rule configuration platform 103. The exemplary devices 13a and 13b are capable of data communications through the particular type of network 15 (and the users thereof typically will have subscribed to data service through the network).

The network 15 allows users of the mobile devices such as 13a and 13b (and other mobile devices not shown) to initiate and receive telephone calls and messages to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile devices 13a and 13b via the Internet 23 may be with devices like those shown at 25 and 27 as well as with a variety of other types of devices or systems capable of data communications through various interconnected networks. The mobile devices 13a and 13b of users also can receive and execute applications written in various programming languages, as discussed in more detail below.

Mobile devices 13a and 13b can take the form of portable handsets, smart-phones or personal digital assistants, although they may be implemented in other form factors. Program applications, provided by the application server 25 or 31 to the mobile devices 13a, 13b and to the user terminals 27 and services provided by the rule configuration platform 103 can be configured to execute on many different types of mobile devices 13a and 13b and user terminals 27. For example, a mobile device application can be written to execute on a binary runtime environment for mobile (BREW-based) mobile device, a Windows Mobile based mobile device, Android, I-Phone, Java Mobile, or RIM based mobile device such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile devices 13a and 13b, can include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, such a base station 17 can include a base transceiver system (BTS), which can communicate via an antennae system at the site of base station and over the airlink with one or more of the mobile devices 13a and 13b, when the mobile devices are within range. Each base station can include a BTS coupled to several antennae mounted on a radio tower within a coverage area often referred to as a "cell." The BTS is the part of the radio network that sends and receives Radio Frequency (RF) signals to/from the mobile devices 13a and 13b that are served by the base station 17.

The radio access networks can also include a traffic network represented generally by the cloud at 15, which carries the user communications and data for the mobile devices 13a and 13b between the base stations 17 and other elements with or through which the mobile devices communicate. In some examples, the mobile traffic network 15 includes network elements that support mobile station media content transfer services such as mobile switching centers (MSCs) 30 and signal transfer points (STP) 34. The network can also include other elements that support functionality other than device-to-device media transfer services such as messaging service messages and voice communications. Examples of other network elements that may be used in support of messaging service message communications include, but are not limited to, message centers (MCs) 39, home location registries (HLRs) 38, simple messaging service (SMS) gateway 40, and other network elements such as wireless internet gateways (WIGs), and visitor location registers (VLRs) (not shown). Other individual elements such as switches and/or routers forming the traffic network 15 are omitted here for simplicity. It will be understood that the various network elements can communicate with each other and other aspects of the mobile communications network 10 and other networks (e.g., the public switched telephone network (PSTN) and the Internet) either directly or indirectly.

The mobile switching center (MSC) 30 is responsible for managing communications between the mobile device and the other elements of the network 10. In addition, the MSC 30 is responsible for handling voice calls and messaging service message requests as well as other services (such as conference calls, FAX and circuit switched data, messaging service communications, Internet access, etc.). The MSC 30 sets up and releases the end-to-end connection or session, and handles mobility and hand-over requirements during the call. The MSC 30 also routes messaging service messages to/from the mobile devices 13a or 13b, typically from/to an appropriate MC 39. The MSC 30 is sometimes referred to as a "switch." The MSC 30 manages the cell sites, the voice trunks, voicemail, and SS7 links.

The message center (MC) 39, in some examples, allows messaging service messages to be exchanged between mobile telephones and other networks. For SMS messaging, for example, the MC 39 receives packet communications containing text messages from originating mobile devices and forwards the messages via the signaling resources and the signaling channels to the appropriate destination mobile devices. The MC 39 may receive messages from external devices for similar delivery to mobile devices, and the MC 39 may receive similar messages from mobile device 13a or 13b and forward them to servers or terminal devices, in either case, via an Internet Protocol (IP) packet data network.

In some examples, the MC 39 can also be considered or include functionality that may be considered that of a Short Messaging Service Message Center (SMSC) or a Message Register (MR). Wireless carriers developed the short message service (SMS) to transmit text messages for display on the mobile devices. In many existing network architectures, the SMS traffic uses the signaling portion of the network 15 to carry message traffic between SMSC 39 and the mobile devices. The SMSC 39 supports mobile device to mobile device delivery of text messages. However, the SMSC 39 also supports communication of messages between the mobile devices and devices coupled to other networks. For example, the SMSC 39 may receive incoming IP message packets from the Internet 23 for delivery via the network 15, one of the base stations 17 and a signaling channel over the air link to a destination mobile device. For this later type of SMS related communications, the network 10 also includes one or more SMS gateways 40.

In other examples, the MC 39 includes functionality related to the Enhanced Messaging Service (EMS) or Multimedia Messaging service (MMS). An EMS message has special text formatting (e.g., such as bold or italic), animations, pictures, icons, sound effects and special ring tones. MMS messages support the sending and receiving of multimedia messages (e.g., images, audio, video and their combinations) to (or from) MMS-enabled mobile devices. In some examples, the MC 39 is considered in whole or in part a multimedia messaging service center (MMSC).

Although a single MC 39 is shown, a network 10 has geographically dispersed MCs 39. The MCs 39 includes destination routing tables (DRTs). In essence the DRTs are databases within the MCs 39. A DRT contains a list of the MDNs which are associated with the various MCs 39. For example, a first MDN is associated with a MC 39 in Minnesota while a second MDN is associated with a MC 39 in Virginia. The DRTs are used to determine which MC 39 should attempt to deliver an incoming messaging service message to the destination MDN. For example, if a user associated with the MC in Minnesota sends an SMS to a user associated with the MC 39 in Virginia, the Minnesota MC 39 sends the SMS to the Virginia MC 39 for delivery to the destination MDN. The communication among the MCs 39 occurs using known protocols such SMPP and the like.

The HLR 38, in some examples, stores a subscriber profile for each of the wireless subscribers and their associated mobile devices 13a and 13b. The HLR 38 may reside in an MSC 30 or in a centralized service control point that communicates with the MSC(s) 30 via an out-of-band signaling system such as an SS7 network. The HLR 38 stores for each mobile subscriber the subscriber's mobile directory number (MDN), the mobile identification number (MIN), and information specifying the wireless services subscribed to by the mobile subscriber, such as numeric paging or text-based paging, data communication services, etc. Of course, the HLR 38 can also be a stand-alone device. The HLR 38 also tracks the current point of attachment of the mobile device to the network, e.g., the identification of the MSC 30 with which the mobile device is currently registered to receive service.

The visitor location register (VLR) (not shown) is, in some examples, a temporary database of the mobile devices that have roamed into the particular area which it serves. The VLRs for a region often are implemented in or in association with a MSC 30. Each base station 17 in the network is served by a single VLR, hence a subscriber cannot be present in more than one VLR at a time. The data stored in the VLR has either been received from the HLR 38, or collected from the mobile device.

The SMS gateway 40 provides functionality to transport messaging service messages to other mobile communication networks and also receive messaging service messages from other networks. The SMS gateway 40 may support communications using the SMPP protocol. SMS gateways 40 can be Short Message Peer-to-Peer gateways used to connect the wireless communication network (such as an Internal Protocol IP network on the left of the SMS Gateway 40 in FIG. 1) to another network (such as a public Internet network on the right of the SMS Gateway 40 in FIG. 1). The SMS Gateway 40 allows the MC 39 to receive and send messages in IP packet format. The SMS Gateway 40 is an entity within the wireless network 10 that acts as an intermediary between the wireless service provider network and other networks. For example, the SMS Gateway 40 converts messages in protocol(s) used by other applications and devices, e.g. Extensible Markup Language (XML), Hypertext Mail Protocol (HTMP), etc., to and from the short SMPP protocol. The SMPP messages may ride on IP transport, e.g., between the SMS Gateway 40 and the MC 39.

In addition, the traffic network portion 15 of the mobile communications network 10 connects to a private data network 29. The private data network 29 connects to the traffic network portion 15 via a gateway (not shown). The gateway provides protocol conversions between the protocols used by the traffic network 15 and the protocols used by the private data network 29.

The private data network 29 is in communication with various auxiliary services servers, e.g., such as those providing additional services to the users of the network 10, and/or to operations support personnel of the service provider or carrier that operates the network 10. In an aspect, private data network 29 is in communication with the rule configuration platform 103, and application servers 25 and 31.

The carrier also operates a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31.

A mobile device 13a or 13b communicates over the air with a base station 17 and through the traffic network 15 for various voice and data communications, e.g. through the Internet 23 with a server 25 and/or with application servers 31. To insure that the application service offered by application servers 25 or 31 is available to only authorized devices/users, the provider of the application service may also deploy an authentication service. The rule configuration platform 103 can be a separate physical server as shown, or the rule configuration platform 103 can be implemented as another program module running on the same hardware platform as an application server 31 or 25.

Servers such as 25 and 31 may provide any of a variety of common application or service functions in support of or in addition to an application program running on the mobile device 13a, 13b, or a user terminal 27. However, for purposes of further discussion, we will focus on functions thereof in support of the rule configuration service. For a given service, including the rule configuration service, an application program within the mobile device may be considered as a 'client application' and the programming at 103, 25 or 31 may be considered as the 'server' application for the particular service.

In an aspect, the server-specific plug-in 107a or 107b receives a request from a mobile device 13a or 13b or from a user terminal 27 for accessing services provided by the application servers 31 and 25. The application server 31 may be a private network provider providing network communication to mobile devices 13a or 13b or user terminals 27. For example, server-specific plug-in 107a or 107b can receive a request from a mobile device 13a or 13b or a user terminal 27, for accessing a network resource (e.g., a website, a file, etc.) provided by an application server 31 or 25. The server-specific plug-in 107a or 107b may receive the request via the application server 31 or 25. The request may include several components and parameters such as, for example, a domain name, an IP address, a network resource identifier, a port number, a query, etc. The request can be an online query received from a mobile device 13a or 13b or a user terminal 27, for example, by activating an application on the mobile device 13a or 13b or user terminal 27.

The server-specific plug-in 107a or 107b may include predefined rule repositories that provide links between service request parameters and configuration rules of the application servers 31 or 25. The server-specific plug-in 107a or 107b can also determine a mapping between the request and each of the one or more rules based on the repository content. The mapping can indicate how the protocol rules are applied when providing the network resource to the mobile device 13a or 13b or user terminal 27. For example, the mapping may provide matches between one or more parameters of the request and the one or more rules associated with the network resource. In such cases, the server-specific plug-in 107a or 107b can modify the request based on the matches provided by the mapping such that execution of the request by the application server 31 or 25 can land the request to a correct resource that provides the requested service to the mobile device 13a or 13b or user terminal 27. The server-specific plug-in 107a or 107b can then send the modified request to the application server 31 or 25 such that the application server 31 or 25 provides access to the network resource to the mobile device 13a or 13b or user terminal 27. The process of request modification by the server-specific plug-in 107a or 107b is transparent to the mobile device 13a or 13b or user terminal 27. Therefore, any changes in the configurations of application servers 31 or 25 and the network resources provided by the application servers 31 or 25 remain transparent from the mobile devices 13a or 13b or user terminals 27.

In another aspect, the rule configuration platform 103 receives a set of protocol rules from a mobile device 13a or 13b or user terminal 27 of an administrator. Each received rule may be associated with a network resource from a set of network resources. The rule configuration platform 103 may also receive credentials associated with a user of the mobile device 13a or 13b or user terminal 27. The rule configuration platform 103 verifies the credentials, for example, by comparing the credentials against a repository of registered users and/or devices. If the credentials are valid, the rule configuration platform 103 associates the received set of rules to the network resources and insert the set of rules in a rule repository.

The rule configuration platform 103 may receive from the same or a different mobile device 13a or 13b or user terminal 27 associated with an administrator, a set of updates associated with the set of rules. For example, a server update or upgrade may require a change in resources provided by the server such as, for example, an address that the resources can be accessed by. In such cases, the administrator can determine a set of rules for redirecting the requests for the upgraded resources to the new addresses of the resources. Prior to applying the updates, the rule configuration platform 103 verifies whether the mobile device 13a or 13b or user terminal 27 has the privilege of applying updates on the protocol rules. The rule configuration platform 103 may receive from the mobile device 13a or 13b or user terminal 27 second credentials associated with a user. If the second credentials are valid, the rule configuration platform 103 updates the set of rules in the rule repository based on the set of updates received. The second credentials providing a user with the right to update rules may be different from the first credentials that provide a user a right to introduce new rules. The difference between the credentials can provide various levels of access to the user. For example, a rule update right may require a higher level of security compared to a rule insert right.

The rule configuration platform 103 can create an abstraction layer between mobile devices 13a or 13b or user terminals 27 on one side and application servers 31 or 25 on the other side by redirecting requests received from the mobile device 13a or 13b or user terminal 27 to resources provided by the application servers 31 or 25 such that changes in the resource configurations may not affect the mobile devices 13a or 13b or user terminal 27 and the structure of the requests received from the mobile devices 13a or 13b or user terminal 27 may remain unchanged.

Figure 2A:
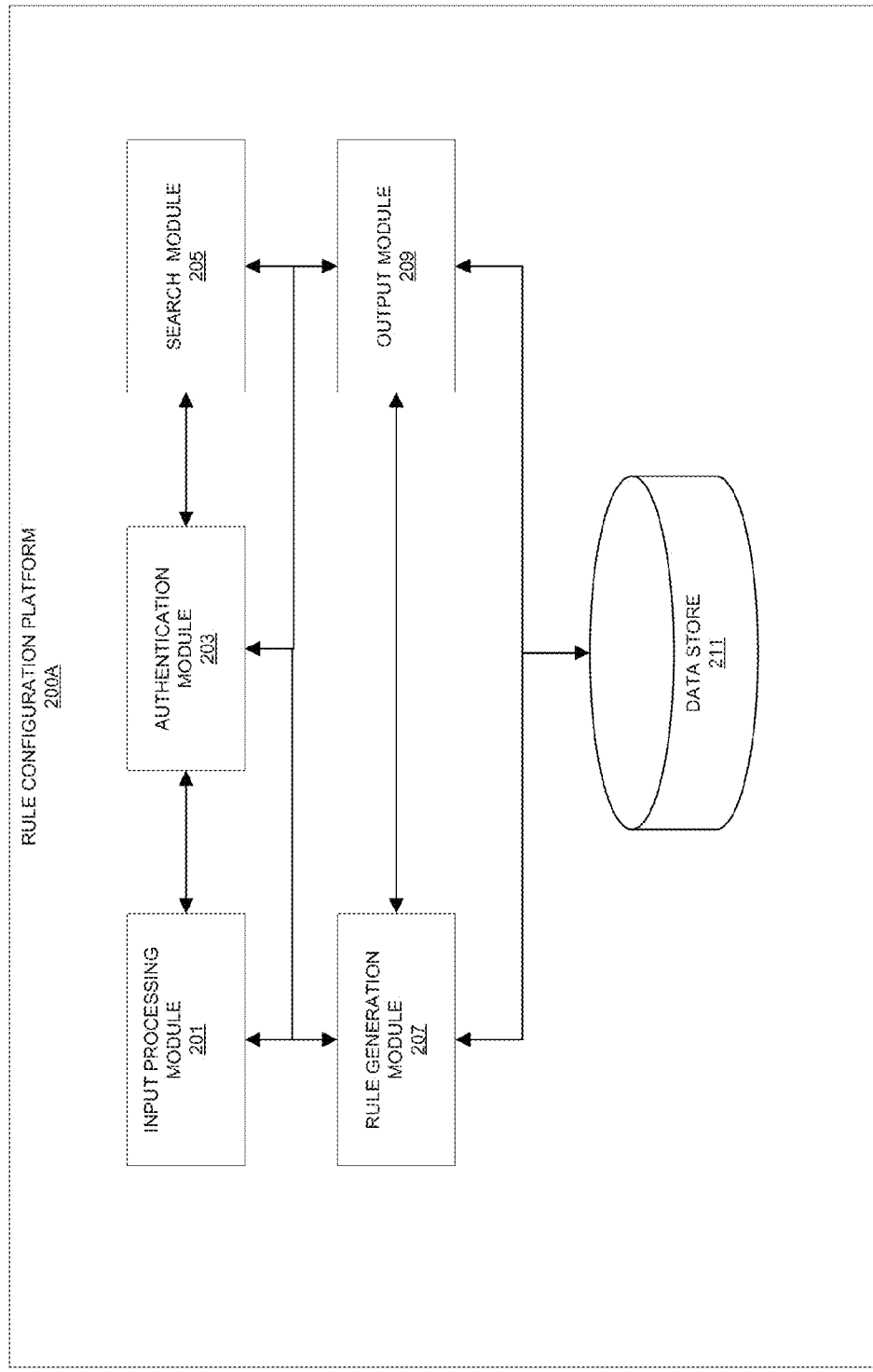
FIG. 2A is a schematic illustration of a rule configuration platform, according to an implementation.

FIG. 2A is a schematic illustration of a rule configuration platform, according to an implementation. The rule configuration platform 200A can be similar to the rule configuration platform 103 of FIG. 1. As previously discussed, the rule configuration platform 200A can be located throughout the mobile communication network 10. The rule configuration platform 200A can provide rule configuration for application server 31 or 25, where the application servers 31 or 25 provide services to mobile devices 13a or 13b or to user terminals 27. In some aspects, the rule configuration platform 200A or one or more modules of the rule configuration platform 200A can be located within a mobile device 13a or 13b or a user terminal 27. As shown in FIG. 2A, the rule configuration platform 200A may include an input processing module 201, an authentication module 203, a search module 205, a rule generation module 207, an output module 209 and a data store 211. As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

The rule configuration platform 200A can provide rule configuration to a mobile device 13a and 13b or a user terminal 27 for accessing applications and network resources provided by the application servers 31 and 25. In some instances, the input processing module 201 receives, from a mobile device 13a or 13b or user terminal 27, a set of rule generation requests associated with a network resource. For example a network resource may be a website, a script, an executable code or any resource available via the network. The set of requests may include data to be included in the rules such as, for example, access information related to the network resource. The access information may include an address location of the network resource, a version associated with the network resource, a date or time associated with last update of the network resource, a type associated with the network resource, etc. The input processing module 201 may also receive credentials associated with a user of the mobile device 13a or 13b or user terminal 27. The user can be an administrator of the rule configuration platform 103 and the credential may indicate the user's authentication data. The input processing module 201 can send the credentials to the authentication module 203. The authentication module 203 can verify whether the user is authorized to insert new rules into a rule repository in the data store 211, based on user authorization data in data store 211. If the authentication module 203 indicates that the user is an authorized user, the input processing module 201 sends the set of requests to the rule generation module 207. The rule generation module 207 generates a set of rules based on the request data and stores the generated rules in the rule repository in data store 211.

The input processing module 201 may also receive a request from an application server 25 or 31 for one or more rules associated with a set of network resources associated with the application server 25 or 31. The request may be received from a server-specific plug-in 107a or 107b associated with the application server 31 or 25. Upon receiving the request, the input processing module 201 may send a request to the search module 205 to search the rule repository in data store 211 for the one or more rules requested by the application server 25 or 31. If the search by the search module 205 indicates finding the one or more rules in the rule repository, the search module 205 sends the set of rules to the output module 209 and the output module 209 sends the rules to the application server 25 or 31.

In some instances, the rule configuration platform 200A can be set up, for example, by an administrator via a mobile device 13a or 13b or a user terminal 27. The setup process can include configuring the data store 211 with rules associated with application servers 31 or 25. This can include, for example, rule data and updated Application Program Interface (API) credentials associated with the server-specific plug-in 200B. The setup process may also include configuring the application server 25 or 31 to incorporate the server-specific plug-in 200B into its runtime processing flow. The server-specific plug-in 200B modules may handle a startup logic, setup a runtime environment for the server-specific plug-in 200B, apply rules to incoming requests (e.g., HTTP requests), and generate responses based on application of rules to the requests, as previously discussed. The setup process may also include configuring additional control parameters for fine tuning behavior of the server-specific plug-in 200B during startup and runtime. This can include, for example, the network address of a data store 231 to read configurations from during a startup.

Figure 2B:
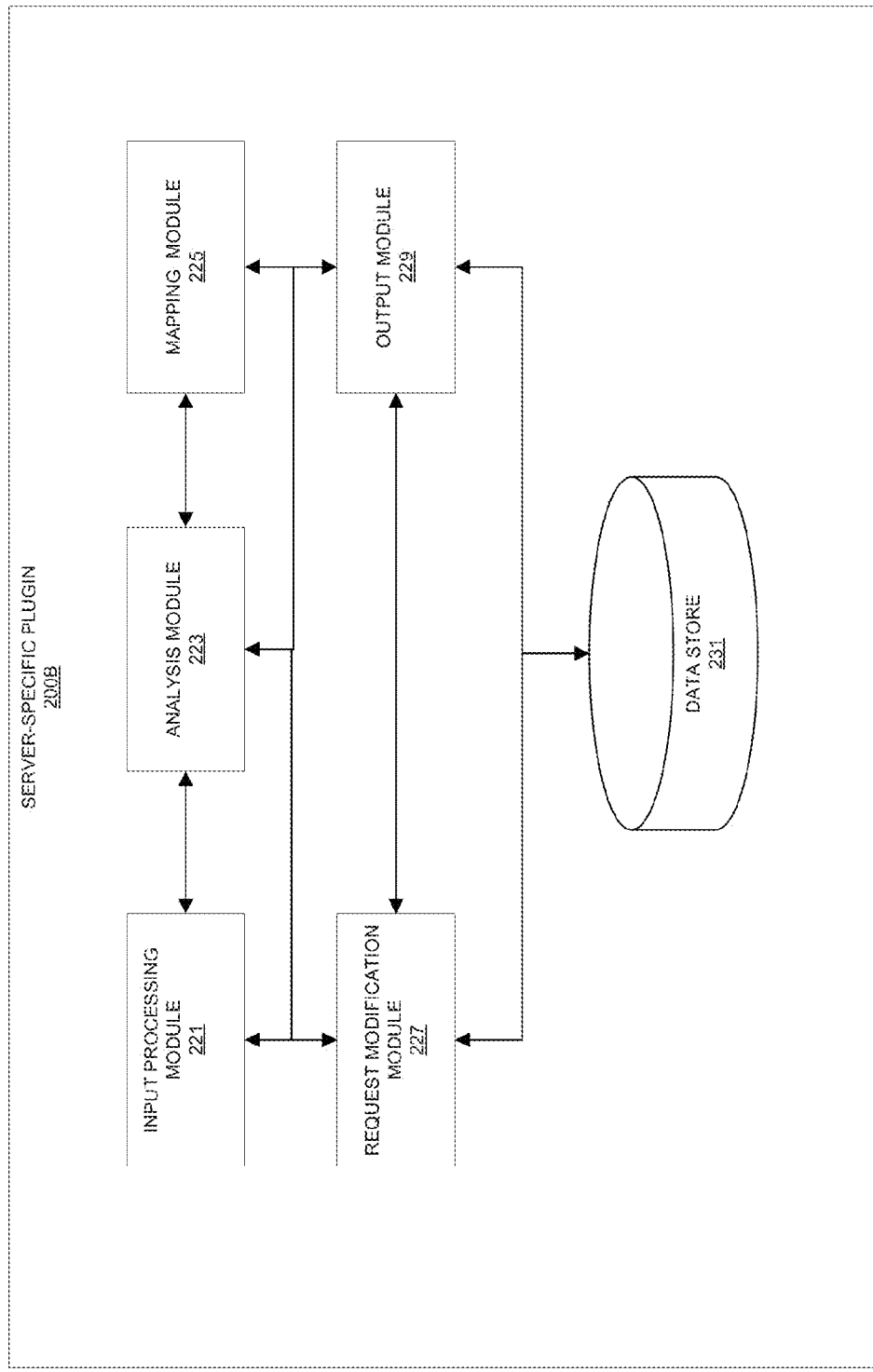
FIG. 2B is a schematic illustration of a server-specific plug-in, according to an implementation.

FIG. 2B is a schematic illustration of a server-specific plug-in, according to an implementation. The server-specific plug-in 200B can be similar to the server-specific plug-in 107a or 107b of FIG. 1. The server-specific plug-in 200B can provide rules for application server 31 or 25, where the application servers 31 or 25 provide services to mobile devices 13a or 13b or to user terminals 27. As shown in FIG. 2B, the server-specific plug-in 200B may include an input processing module 221, an analysis module 223, a mapping module 225, a request modification module 227, an output module 229 and a data store 231. The data store 231 may be a data store of application server 31 or 25 associated with the server-specific plug-in 200B.

As previously discussed with respect to FIG. 2A, the input processing module 221 may receive, from the rule configuration platform 103, a set of rules associated with a set of network resources associated with the application server 25 or 31. The set of rules provide information for accessing the network resources to the application server 25 or 31. The input processing module 201 can store the set of rules in data store 231.

The input processing module 221 receives, from a mobile device 13a or 13b or user terminal 27, a request for accessing a network resource. For example, the network resource may be a website and a user of the mobile device 13a or 13b or user terminal 27 may use a web browser and a Uniform Resource Locator (URL) for accessing the website. The request (e.g., the URL) may include multiple parameters or components such as, for example, a domain name, an Internet Protocol (IP) address, a network resource identifier, a port number, a query, etc. Upon receiving the request, the input processing module 221 can send the request to the analysis module 223 to determine one or more protocol rules associated with the network resource from the data store 231. The rules may, for example include, logic to determine a landing webpage or address for a request URL. The rules may also include customization information associated with the network resource such as, for example, customization of an application provided by an application server 31 or 25. The rules may also include startup information associated with the network resource. For example, the rules may determine parameters that an application requires for running on the mobile device 13a or 13b or user terminal 27. These parameters may be different for every device type.

The analysis module 223 may then inform the mapping module 225 that the rules for the network resource are ready for mapping. The mapping module 225 can retrieve the one or more rules determined by the analysis module 223 from the data store 231 and determine a mapping between the request and each of the one or more rules based on the content of the request and parameters included in the request. The mapping can customize processing of the request by incorporating the rules into the process. In some cases, a process for the request may already exist and the mapping module may determine that no match between the one or more rules and the request was found. In such cases, the request may not need modification. However, in other cases, the mapping by the mapping module 225 may provide one or more matches between some parameters or components of the request and the one or more rules indicating that those parameters or components need to be modified based on the one or more determined rules. The mapping module 225 can report the matches found to the request modification module 227 and the request modification module 227 can generate a modified request based on the one or more matches. The request modification module 227 may store the modified request in data store 231.

A network resource may have been modified since the last time the mobile device 13a or 13b or user terminal 27 has accessed the network resource via the application server 31 or 25. In such cases, the application server 31 or 25, or an administrator providing the network resource, may inform the rule configuration platform 200A of changes in the network resource such as for example, an access method, an address, a providing servers configuration, etc. by sending the modification data to the rule configuration platform 200A. The rule configuration platform 200A may receive the modification information from the application server 31 or 25 and the rule generation module 207 can generate new rules based on the modification information. The new rules may include rules for redirecting requests for the network resource based on the modifications. The rule generation module 207 can generate and insert the new rules in the rule repository in data store 211.

The rule configuration platform 200A may also link the new rules to the network resource and the application server 31 or 25, for example, by creating a mapping table at the data store 211 that maps an index associated with each network resource to an indicator of a set of rules. The rule configuration platform 200A can send the mapping to the server-specific plug-in 200B of the application server 31 or 25 and the server-specific plug-in 200B can store the mapping in data store 231. The next time a mobile device 13a or 13b or user terminal 27 attempts to access the network resource, the mapping module 225 may find a match between the request and the new rules, using the mapping, indicating that the request may need to be modified according to the changes in the modified network resource. Upon generation of the modified request by the request modification module 227, as discussed above, the output module 229 can send the modified request to the application server 31 or 25, where the application server 31 or 25 provides access to the network resource to the mobile device 13a or 13b or user terminal 27 based on the modified request.

In some instances, at a startup, the server-specific plug-in 200B initiates a connection to the rule configuration platform 200A to retrieve and validate necessary information from the data store 211. If any vital configurations expected to be in the data store are missing, malformed (e.g. damaged), not reachable (the network 15 could not be connected to, etc.), the server-specific plug-in 200B may setup its operating parameters based on pre-defined defaults if possible or fail to startup if no alternative error handling can viably remedy the situation. If the server-specific plug-in 200B fails to startup, it may also stop the application server 25 or 31 from starting up if possible and, upon receiving a request from a mobile device 13a or 13b or user terminal 27, notify the mobile device 13a or 13b or user terminal 27 of an error. If the server-specific plug-in 200B successfully starts-up, then the rule providing process as described above can be performed.

Figure 3A:
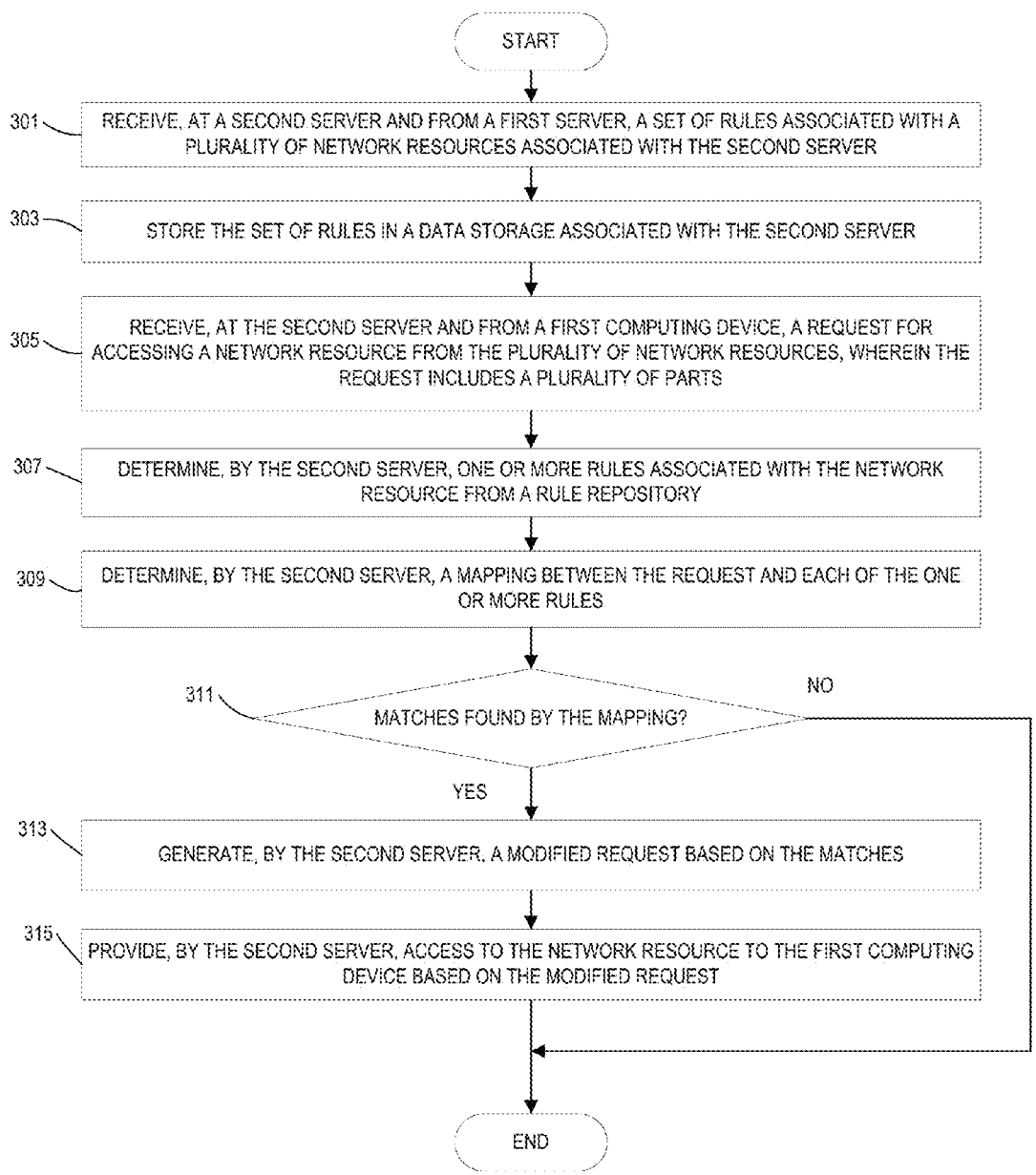
FIGS. 3A-3B are exemplary processes for providing rule configuration for communication protocols.
Figure 3B:
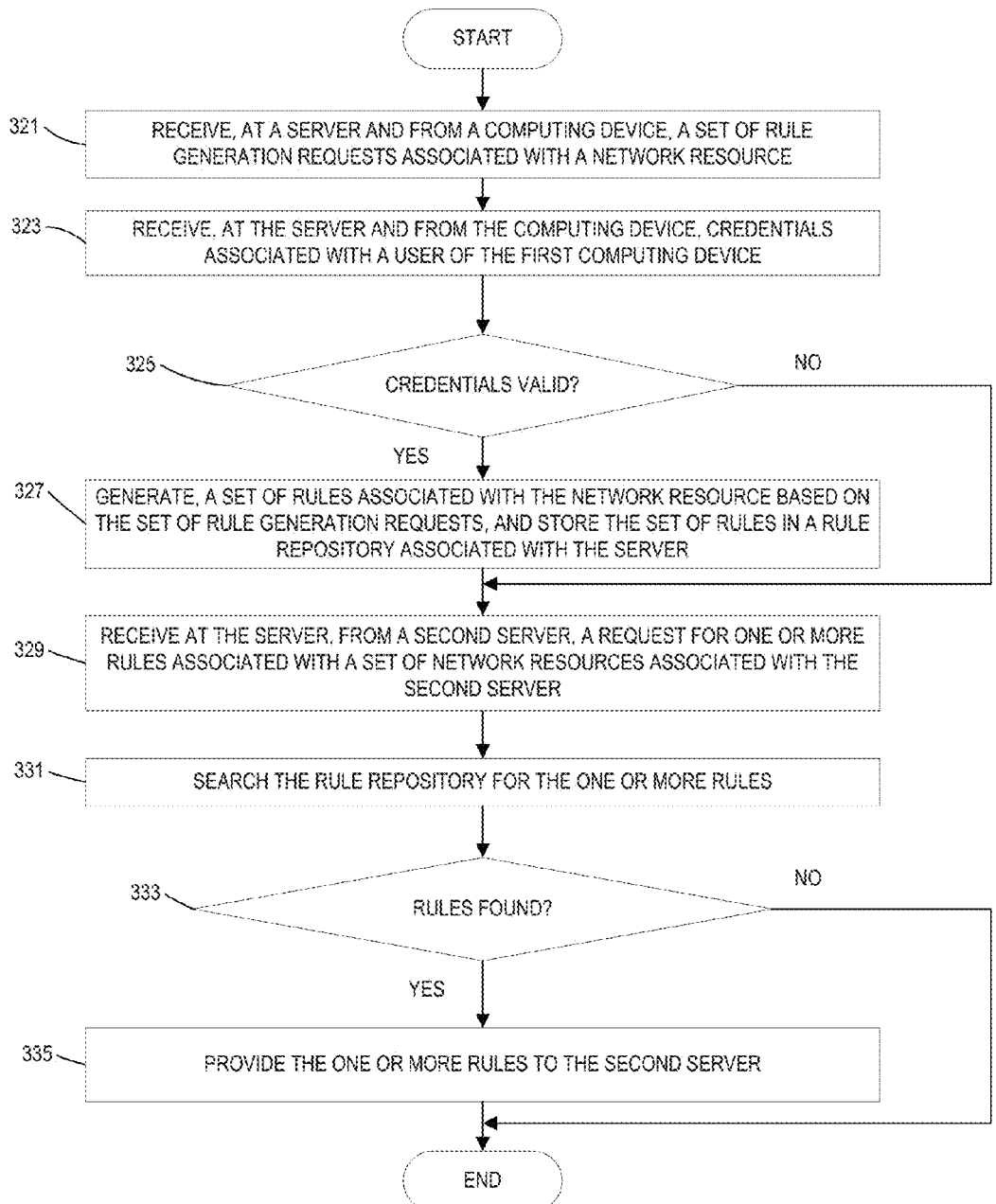

FIGS. 3A-3B are exemplary processes for providing rule configuration for communication protocols. Although FIGS. 3A and 3B are described with reference to FIGS. 1 and 2, the subject technology is not limited to such and can apply to other computing devices and systems. FIG. 3A is an exemplary process for providing rule configuration for mobile devices and user terminals. At block 301, the application server 31 or 25 receives, from the rule configuration platform 200A, a set of rules associated with a set of network resources associated with the application server 25 or 31. The set of rules are associated with the network resources provided by the application server 31 or 25.

At block 303, the application server 31 or 25 stores the set of rules in a data storage. For example, a server-specific plug-in 200A associated with the application server 31 or 25 may store the set of rules in data store 231. At block 305, the input module 221 receives a request from a mobile device 13a or 13b or user terminal 27 for accessing a network resource provided by an application server 31 or 25. The request may include several parameters or components identifying parameters related to the request, to the application server 31 or 25 providing the network resource or to the network resource itself. The network resource can, for example, be a World Wide Web resource provided by a web server (application server 31 or 25), and the request can be a URL for accessing the World Wide Web resource via a web server. The parameters or components of a request may include, for example, a domain name, an IP address, a network resource identifier, a port number, a query, etc. The components may also include information related to the mobile device 13a or 13b or user terminal 27 such as a current location of the mobile device 13a or 13b or the user terminal 27 represented by an address, a zip code, a nearby landmark, etc. The access information may include, a type or a version associated with the mobile device 13a or 13b or the user terminal 27.

The input processing module 221 may store the request in a data store 231. Upon storage of the request in data store 231, the analysis module 223 may retrieve the request from the data store 231 and (as shown in block 307) analyze the request by determining its components and one or more rules associated with the network resource requested, of the application server 31 or 25 that provides the network resource. The rules may include one or more instructions for directing the request to the network resource. A rule may direct the request to a network resource based on the parameters in the request such as the current location of the mobile device 13a or 13b or the user terminal 27, based on the type or the version associated with the mobile device 13a or 13b or the user terminal 27, etc. For example, a rule may be designated for redirecting a request for technical assistance from a mobile device 13a of a certain model A to a web site or a page within a website providing technical assistance for model A while same request from a mobile device 13b of a model B is redirected to a different page with technical assistance for model B. The analysis module 223 may store the analysis results in data store 231 and inform the mapping module 225 of the analysis results. Upon receiving the analysis results from the analysis module 223, at block 309, the mapping module 225 can determine a mapping between the request and its components and each of the one or more rules. The mapping may identify updates that need to be applied to the request or to any of its components in order to comply with the one or more rules associated with the network resource or the application server 31 or 25. The mapping module 225 may store the mapping results in data store 231 and report the results to the request modification module 227.

At block 311, the request modification module 227 determines whether the mapping by the mapping module 225 provides one or more matches between one or more parameters of the request and the one or more rules. If the matches are provided, indicating that the one or more parameters need modification to comply with the rules, at block 313 the request modification module 227 generates a modified request based on the one or more matches such that the modified request comply with the one or more rules associated with the network resource and the application server 31 or 25. Subsequently, the request modification module 227 can send the modified request to the output module 229 such that the output module 229 can send the modified request to the application server 31 or 25 for processing and providing access to the network resource to the mobile device 13a or 13b or user terminal 27, as shown in block 315. The request modification module 227 may also store the modified request in data store 231 to be used in the future as is discussed below.

The one or more parameters or components of the request can provide parameters for directing the request to the network resource. For example, an application server 31 or 25 may include several data centers, where each data center hosts a part of the network resources provided by the application server and a parameter of the request may identify the data center hosting the requested network resource. However, at some point the requested network resource may be moved (e.g., migrated) to a new data center while the request received from the computing device may direct to the old data center. In this example, a rule in the data store 231 may indicate that a request for the network resource should be directed to the new data center. Therefore, the request modification module 227 can modify the request for the network resource based on the rule such that the parameter directing the request to the old data center is modified to a parameter that directs the modified request to the new data center.

In some instances, the mapping module 225 may determine that no mapping can be found between the request and the rules associated with the network resource. In such cases, no modification may be necessary on the request. In some other instances, the analysis module 223 may determine, based on a request history, that the same request has been recently (e.g., within a predetermined time threshold) processed for the same network resource and a modified request has been stored in data store 231. For example, the predetermined time threshold can be determined based on the latest date that any updates were applied on the rule repository for that network resource. If the last update of the rules associated with the network resource was earlier than the date of the modification of the request and storage of the modified request in data store 231, then the modified request can still be used for accessing the network resource. In such cases, the analysis module 223 can inform the output module 229 that the modified request is stored in data store 231. The output module 229 can retrieve the modified request from the data store 231 and send the request to the application server 31 or 25.

In some instances, the input processing module 221 receives a redirecting schedule from the application server 31 or 25. For example, the network resources managed by the application server 31 or 25 may be planned to be transferred to a different platform with different configuration and a new different set of rules to be applied to a request for accessing the network resources. The new rule set associated with the new platform may be part of the configuration of the new platform or defined by the application server 31 or 25 based on such configuration. The rule configuration platform 200A may provide the new rule set to the server-specific plug-in 200B with a redirection schedule identifying a schedule for the transfer. The schedule may identify a date and/or a time when the application server 31 or 25 starts providing the network resources from the new platform with new configuration. In such cases, until the start of the redirecting schedule, the analysis module 223 determines the one or more rules associated with the network resource from the data store 231, as previously discussed. However, once the redirecting schedule starts, the analysis module 223 determines the one or more rules associated with the network resource from the new rule set, in the data store 231, associated with the new platform. In addition, once the redirection schedule starts, the new rule set may be assigned as a default rule set for the network resources.

The rule configuration platform 200A may automatically provide the set of rules to the server-specific plug-in 200B based on a predetermined timing schedule. For example, the predetermined schedule may indicate that the rule configuration platform 200A provides the set of rules to the server-specific plug-in 200B once a day, once a week, at a certain time every day, on a certain day every week, etc. In other instances the rule configuration platform 200A may provide the set of rules to the server-specific plug-in 200B whenever new rules are ready for sending. For example, the rule configuration platform 200A may send a notification to the application server 31 or 25 or to the server-specific plug-in 200B indicating that new set of rules is available. The rule configuration platform 200A may send the new rules upon receiving a request from the server-specific plug-in 200B. The server-specific plug-in 200B may send a request to the rule configuration platform 200A for new rules based on a predefined schedule, based on expiration information associated with the rules in the server-specific plug-in 200B, based on receiving a request for a network resource from a mobile device 13a or 13b or user terminal 27, or a combination thereof.

FIG. 3B is an exemplary process for providing setup for the rule configuration platform.

At block 321, the rule configuration platform 200A receives a set of rule generation requests associated with the network resource from a mobile device 13a or 13b or a user terminal 27 associated with an administrator of the application server 31 or 25. For example, the administrator associated with the application server 31 or 25 may send a new rule repository to the rule configuration platform 200A, as discussed above, via a mobile device 13a or 13b or user terminal 27. The input processing module 201 may receive the set of rules and store the set of rules in data store 211. At block 323, the input processing module 201 receives credentials associated with a user of the mobile device 13a or 13b, or user terminal 27 (e.g., the administrator). The credentials can determine whether the user is allowed to insert, remove, or update the rules. At block 325, the authentication module 203 verifies the user credentials. The input processing module 201 may store the set of rules in data store 211 upon verification of the credentials.

If the credentials are valid, at block 327, the rule generation module 207 generates a set of rules associated with the network resource based on the set of rule generation requests, and stores the set of rules in data store 211. At block 329, the input processing module 201 receives a request, from a server-specific plug-in 200B, for one or more rules associated with a set of network resources associated with an application server 25 or 31. Upon receiving the request, at block 331, the search module 205 searches the rule repository in data store 211 for the one or more rules. In an alternative scenario, the search module 205 may search the data store 211 for one or more rules without receiving a request and, for example, based on a predefined schedule. If the one or more rules are found by the search module 205, per block 333, at block 335 the output module 209 provides the one or more rules to the application server 25 or 31 via the server-specific plug-in 200B associated with the server.

The input processing module 201 may also receive a set of rule updates from a mobile device 13a or 13b or user terminal 27. Similarly, the authentication module 203 receives credentials for the user sending the updates and verifies the credentials prior to allowing the updates to be applied on the rules. If the user credentials indicate that the use is a valid user, the authentication module 203 sends the updates to the rule generation module 207. The rule generation module 207 applies the received updates on the rules in the rules repository in data store 211 and stores the updated rules in data store 211.

The set of rules received by the rule configuration platform 200A may include rules specifically associated with the application server 31 or 25. Similarly, the set of rule updates may be updates specific to the application server 31 or 25. The authentication module 203 may verify validity of the rules prior to the rules being stored in data store 211. For example, at any step on the process discussed above, upon determining, receiving, or updating the set of rules and prior to storing the rules in data store 211, the authentication module 203 can verify validity of the rules. The validity of the rules can be verified, for example, based on a predefined rule format, based on configurations of the application server 31 or 25, based on configurations associated with the network resource, or a combination thereof. In addition the server-specific plug-in 200B may also verify validity of the rules received from the rule configuration platform 200A prior to responding to a request for network resource.

The data store 211 can be a centralized memory accessible by the rule configuration platform 200A and by the application server 31 or 25. For example, the data store 211 may be a distributed memory storage located in any location in network 10 of FIG. 1 and accessible to the rule configuration platform 103 and the application servers 31 or 25 via the communication network 15 or networks 29 or 23.

Figure 4A:
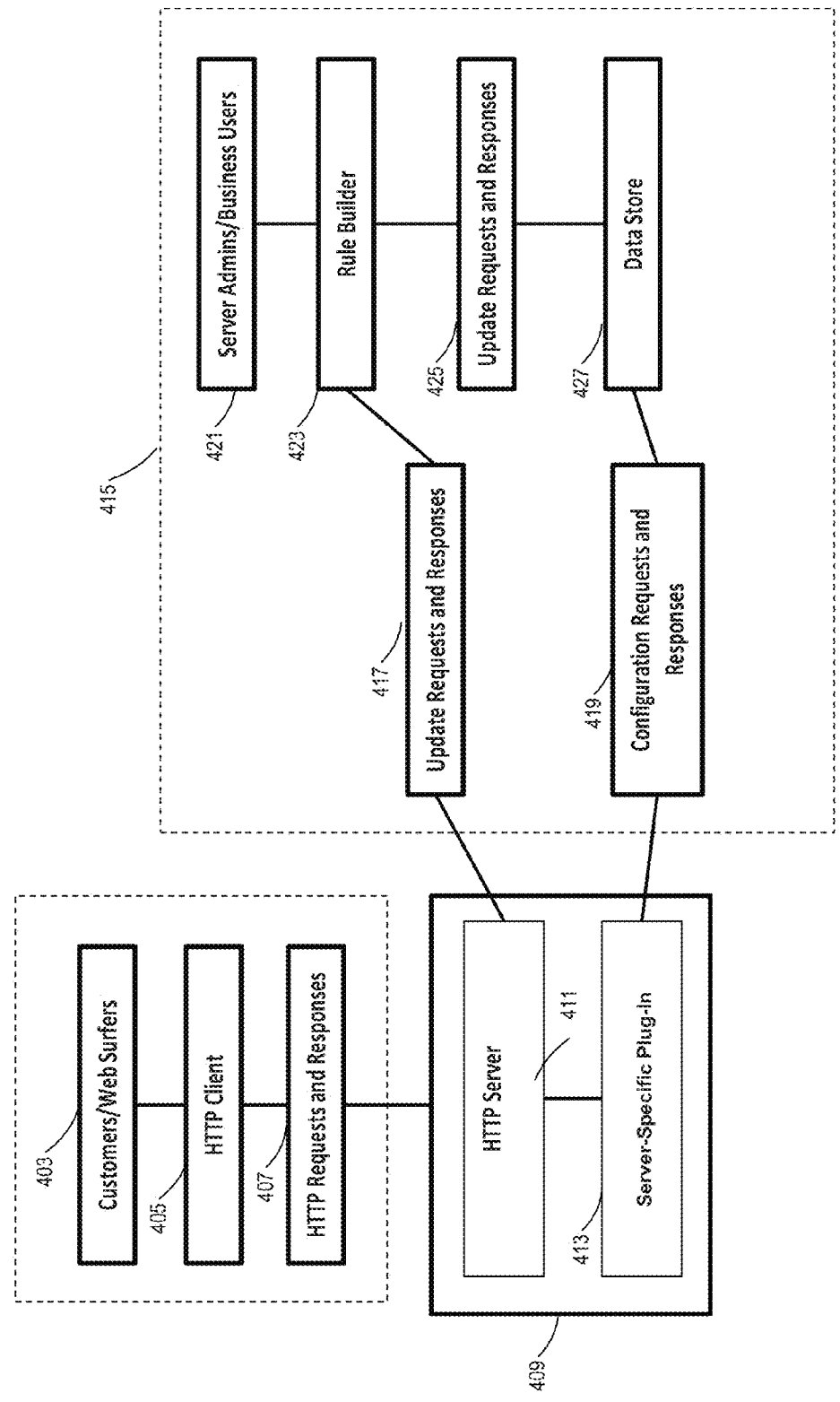
FIGS. 4A-4B are exemplary block diagrams of providing rule configuration by the rule configuration platform shown in FIG. 2.
Figure 4B:
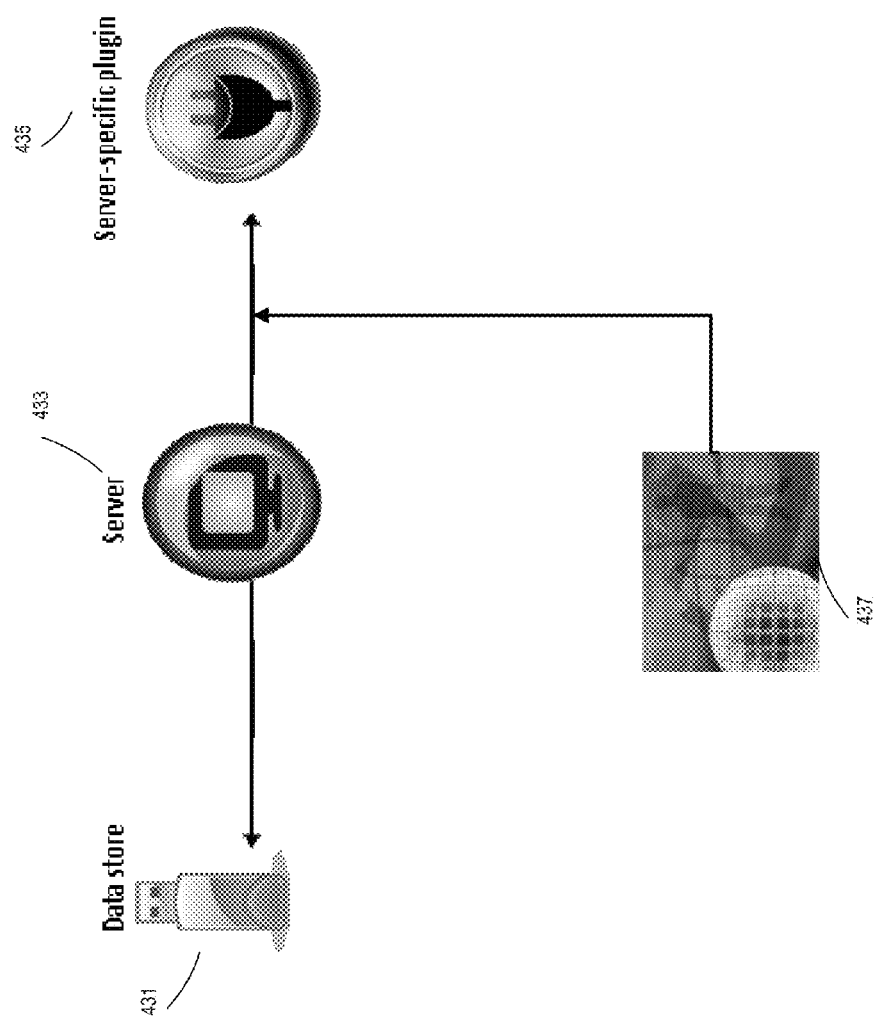

FIGS. 4A-4B are exemplary block diagrams of providing rule configuration by the rule configuration platform shown in FIGS. 2A and 2B. FIG. 4A is an exemplary block diagram of communication among a rule configuration platform 415 (similar to the rule configuration platform 103 of FIG. 1), an HTTP server 411 (similar to application servers 31 and 25 of FIG. 1), customer devices 403 (similar to mobile device 13a or 13b or user terminal 27 of FIG. 1) and server admins/Business users 421 (similar to mobile device 13a or 13b or user terminal 27 of FIG. 1). The HTTP server 411 is associated with a server-specific plug-in 413 (similar to the server-specific plug-in 107a or 107b of FIG. 1).

The customer or internet user 403 visits a website (a network resource) that is being hosted on the HTTP server 411. A HTTP client 405 enables the customer device 403 to communicate using the HTTP protocol with the HTTP server 411. The HTTP client 405 sends HTTP requests to HTTP server 411 and receives HTTP responses from the HTTP server 411 (shown as block 407)

The HTTP server 411 receives HTTP requests from the customer device 403 and delegates the requests to the -specific plug-in 413 for evaluation and processing, as discussed above with regards to FIGS. 2A, 2B, 3A and 3B. The server-specific plug-in 413 evaluates HTTP requests to determine if there are any applicable rules. If a rule applies to a particular request, the configured response parameters are returned in the HTTP response to the customer device 403. The server-specific plug-in 413 may request updates from the rule configuration platform 415. The rule configuration platform 415 may retrieve updates from the data store 427 (similar to data store 211 of FIG. 2A) when prompted to do so, for example, by the server-specific plug-in 413 of the HTTP server 411.

Upon completion of the process by the server-specific plug-in 413, the HTTP server 411 returns an HTTP response that reflects the results 407 of the processing by the server-specific plug-in 413 processing to the customer 403 via the HTTP client 405. In the example of FIG. 4A the HTTP server 411 and the server-specific plug-in 413 are co-located within a platform 409.

The server administrators or business users 421 are users that have authorization to update and deploy rules using a rule builder interface 423 (similar to the rule generation module 207 of FIG. 2A). The rule builder interface 423 can be created to build rules and store them in the data store 427. These clients can send update requests to the data store 427 using a network communication protocol (shown as block 425). The rule builder interface 423 can also receive requests from the HTTP server 411 (shown as block 417) that trigger the rule configuration platform 415 to update the rules according to parameters of the request. The data store 427 can be in a centralized location for rule configuration storage and updates. The rule configuration platform 415 can receive configurations requests from the server-specific plug-in 413 (shown as block 419) when instructed to update the rules, for example by the HTTP server 411.

FIG. 4B is an exemplary block diagram of communication among a server-specific plug-in 435 (similar to the server-specific plug-in 107a or 107b of FIG. 1), a server 433 (similar to application servers 31 and 25 of FIG. 1), a data store 431 (similar to the data store 211 of the rule configuration platform 103 of FIG. 2A) and a user device 437 (similar to mobile device 13a or 13b or user terminal 27 of FIG. 1).

The server-specific plug-in 435 implements rule configuration for the server 433 as described with regards to FIGS. 2A, 2B, 3A and 3B. The data store 431 can provide a common platform for configuring HTTP rules across different implementations of HTTP servers. It achieves this goal by utilizing an agent (e.g., the server-specific plug-in 435) that can be resident within a server application of server 433 to access formatted rule configurations from a centralized data store 431 and translate them into sets of logical triggers that alter the behavior of server 433 when certain conditions are met. For example, the agent, as discussed above with regards to FIGS. 3A and 3B, can redirect a request received at server 433 to a different address based on the formatted rule configurations of the centralized data store 431.

The server 433 can automatically load all existing rules from a specified cache on startup. Upon receiving a request, the server 433 can also load rules from a specified cache during runtime. The server-specific plug-in 435 can validate rule structures before the rules are stored in the server's local memory.

The server 433 can be configured to delegate processing related to the rule configuration to the server-specific plug-in 435. The server-specific plug-in 435 and the rule configuration platform associated with the data store 431 (not shown in FIG. 4B) contain the logic required to perform rule processing, validation, and updates, as previously discussed.

The user device 437 sends a special HTTP request to the server 433 to trigger data updates or perform data reads. In the case where the server 433 is instructed to add a new rule to its runtime environment, the server 433 can retrieve the relevant data from a cache specified in the HTTP request headers.

The user device 437 can send HTTP requests to server-433 to perform data reads. The data can be stored in data store 431 as key value pairs of strings where the key can be any string that represents an array of objects.

The format of the data in the data store 431 and the set of functionalities provided by the server-specific plug-in 435 can be updated. The set of functionalities provided by the plug-in 435 can be extensible such that new functionalities can be incorporated without impacting existing functionalities.

Figure 5:
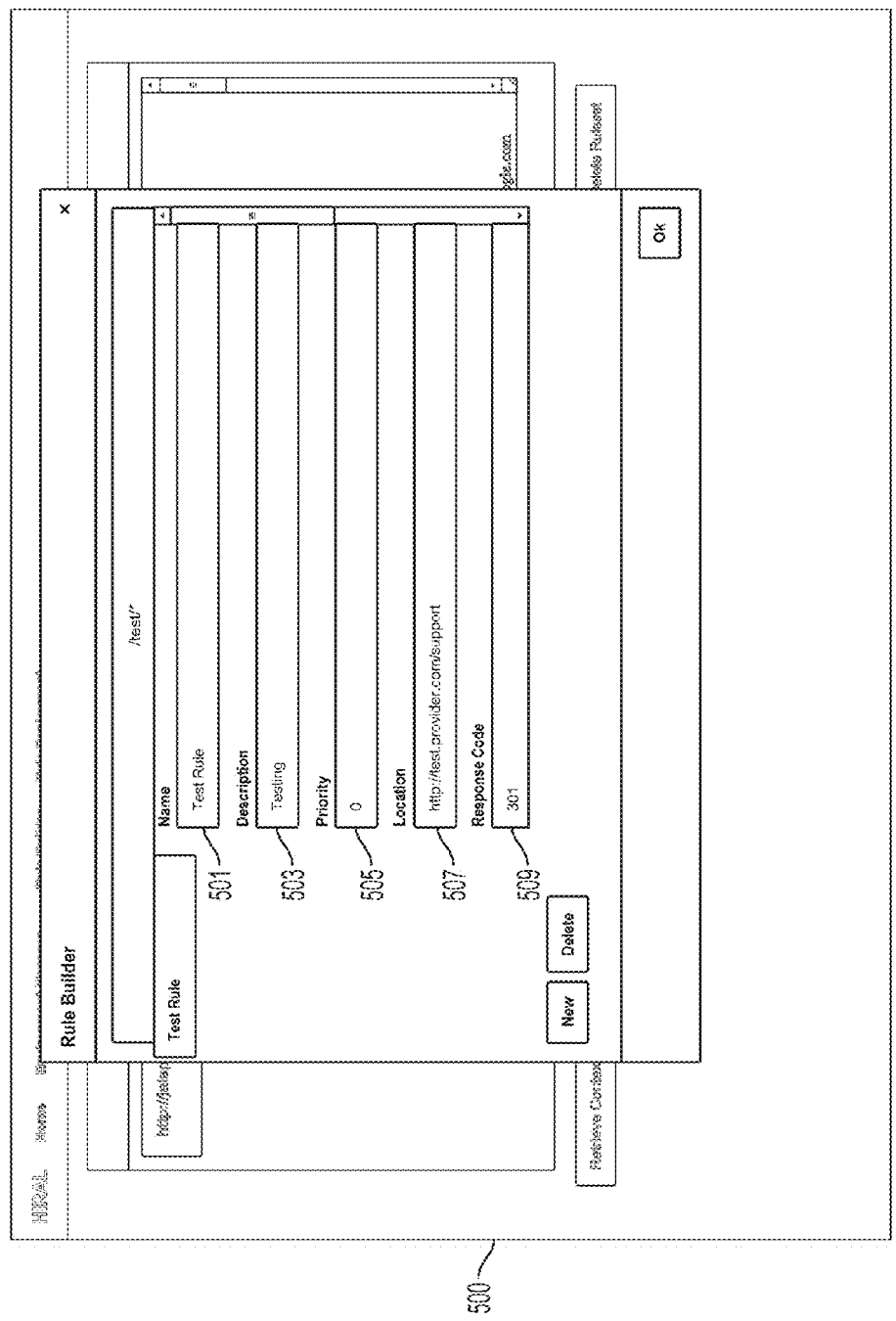
FIG. 5 is an exemplary screenshots provided by the rule configuration platform shown in FIG. 2.

FIG. 5 is an exemplary screenshot provided by the rule configuration platform shown in FIG. 2A. FIG. 5 is a screenshot provided to an administrator using a mobile device 13a or 13b or a user terminal 27, for rule generation by the rule generation module 207 of the rule configuration platform 200A.

Using the web interface 500 a user can fill in fields to provide details about the rule he/she wants to generate. The fields include a name 501 of the rule, a description 503 of the rule, a priority 505 of the rule compared to other rules, a location address 507 for the rule and a response code for the rule. Subsequent to the fields being filled by the user, the rule generation module 207 can generate the rules, as previously described. The rule generation module 207 can store the generated rule in data store 211. Alternatively, the user may save rules that they generated in the data store 211. The rules that are saved in the data store 211 can be automatically loaded on startup by any application server 31 or 25 configured to communicate with the rule configuration platform 200A. Validation is performed by the authentication module 203 for rules that are read from the data store 211 to ensure that loaded rules can be applied during runtime without unexpected behavior.

The administrator using a mobile device 13a or 13b or a user terminal 27, can also update rules by sending rule update requests to the rule configuration platform 200A. The user (e.g., administrator) can remove, add, or update rules from the data store 211 while the application server 31 or 25 remains active. This can be performed by sending special requests to the application server 31 or 25. The update logic of the server-specific plug-in 200B can detect requests that are intended for the server-specific plug-in 200B by monitoring a reserved server context for requests containing special header values. The server-specific plug-in 200B can then perform the appropriate action using the data contained in the special headers.

An authorized user of the rule configuration platform 200A, such as an administrator, a marketer, etc. can use the screen shown in FIG. 5 to perform a setup process of the rule configuration platform 200A by inserting, removing or updating rules in data store 211. For example, a marketer may introduce an easy to remember URL (www.provider.com/myeasyaccess) for a website such that the website user can easily enter the address into a browser and access the website. However, the real URL may include multiple parameters as inputs to the server such that the server can obtain the requested resource and provide the resource to the mobile device 13a or 13b or user terminal 27 using the input parameters. For example, the URL parameters may include name of a protocol used for transferring the resource over a network, name of a server hosting the resource, name of the resource or a path for accessing the resource. The URL may include other parameters such as a domain name, an IP address, a network resource identifier, a port number, a query, a type or a version associated with the mobile device 13a or 13b or the user terminal 27, a current location of the mobile device 13a or 13b or the user terminal 27 represented by an address, a zip code, a nearby landmark, etc. A real URL including the parameters may be a long string and inconvenient for a user to remember, to take note of, or to enter into a browser. For example, a real URL for accessing a resource named "resource1" may look like:

http://aaa.bbbb.org/ccc/%D8%A7%D8%B3%D8%B7% D9%88% D8%AE%D9%88%D8%AF%D9%88%D8%B3.

In order to redirect the simplified request (www.provider.com/myeasyaccess) received from a mobile device 13a or 13b or user terminal 27 at the server to the real address http://aaa.bbbb.org/ccc/%D8%A7%D8%B3%D8%B7% D9%88%D8%AE%D9%88%D8%AF%D9%88%D8%B3, the administrator or marketer can define a rule by entering a rule name at 501, a description of the rule at 503, a priority of the rule at 505, a location of the target address (the real address above) at 507 and a response code at 509. The response code can be an error code returned, for example, if the real address is entered incorrectly at 507 or if the real address is not found in data store 211.

The real URL may be updated due to various technical, strategic or legal issues. The data centers providing the network resources may be upgraded, migrated, or temporarily deactivated. The framework, as described, can significantly increase the speed of implementing, testing, and deploying redirect rules. It can also give business users the ability to implement rules without having to rely on the infrastructure team. This is due to the simplicity of the rule building process coupled with the security given by the constrained functionality of the framework's configurations. If the need arises to add the same functionalities to another type of application server 31 or 25, it can be performed by providing the target server 31 or 25 with a server-specific plug-in 200B, where the server-specific plug-in 200B provides a programming library with sufficient capabilities for the target server 31 or 25.

In various instances, the framework, as described, as a client-side component can give the benefit of rule-driven communication while offloading the network resource usage associated with performing rule evaluation. This allows for better network throughput as the application servers, which are communication bottlenecks on the network, do not have to consider CPU and resources needed to process the rules. As such, the processing power of the application servers can be dedicated to serving content and can exhibit better performance and produce responses much quicker as a result of lighter request loads. The manner in which client-side rules are refreshed and the nuances governing how to ensure clients are not bypassing the rule layer are situational and can be tailored to the server and its needs via the server-specific plug-in.

For example, a local rule store at the application server (e.g., data store 231 of FIG. 2B) can be refreshed using a timestamp-based refresh policy. Upon receiving a request from a mobile device 13a or 13b or user terminal 27, the expiration timestamp of the current rule set is checked, for example by the analysis module 223. If it is less than or equal to the current time, an update request is sent to the rule configuration platform 200A and the rule store 211 and the expiration timestamp is updated based on the response from the rule configuration platform 200A. The request then takes place normally. All applicable rules are applied to the outgoing request and incoming response.

To ensure that communication is happening strictly through the server-specific plug-in 200B, a token-based algorithm can be employed. Any request being sent via the server-specific plug-in 200B can have some verifiable/secure token associated with it that is known/calculable only by the server-specific plug-in 107a or 107b and the rule configuration platform 200A based on some algorithm. This way, any raw protocol requests being sent by non-standard application servers may fail validation at the rule configuration platform 200A.

Figure 6:
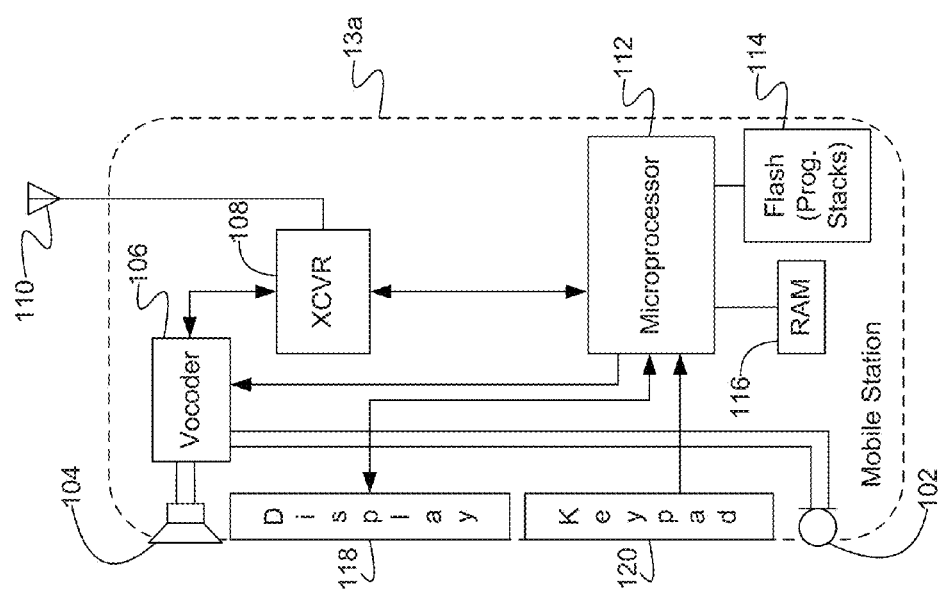
FIG. 6 is a high-level functional block diagram of an exemplary non-touch type mobile device that may utilize the rule configuration service through a network/system like that shown in FIG. 1.

FIG. 6 provides a block diagram illustration of an exemplary non-touch type mobile device 13a. Although the mobile device 13a may be a smart-phone or may be incorporated into another device, such as a personal digital assistant (PDA) or the like, for discussion purposes, the illustration shows the mobile device 13a is in the form of a handset. The handset implementation of the mobile device 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. Today, the handset 13a would be configured for digital wireless communications using one or more of the common network technology types. The concepts discussed here encompass implementations of the mobile device 13a utilizing any digital transceivers that conform to current or future developed digital wireless communication standards. The mobile device 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile device 13a includes a display 118 for displaying messages, menus or the like; call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during rule configuration process. For example, if used for rule configuration provided by a rule configuration platform 103 or requesting the rule configuration service to applications.

A microprocessor 112 serves as a programmable controller for the mobile device 13a, in that it controls all operations of the mobile device 13a in accord with programming that it executes, for all normal operations, and for operations involved in the rule configuration procedure under consideration here. In the example, the mobile device 13a includes flash type program memory 114, for storage of various "software" or "firmware" program routines and mobile configuration settings, such as mobile directory number (MDN) and/or mobile identification number (MIN), etc. The mobile device 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile device 13a includes a processor, and programming stored in the flash memory 114 configures the processor so that the mobile device is capable of performing various desired functions, including in this case the functions involved in the technique for providing rule configuration services. For example, any of the modules of the rule configuration platform 103 or any parameters of the modules can be located on the mobile device 13a or 13b.

Figure 7:
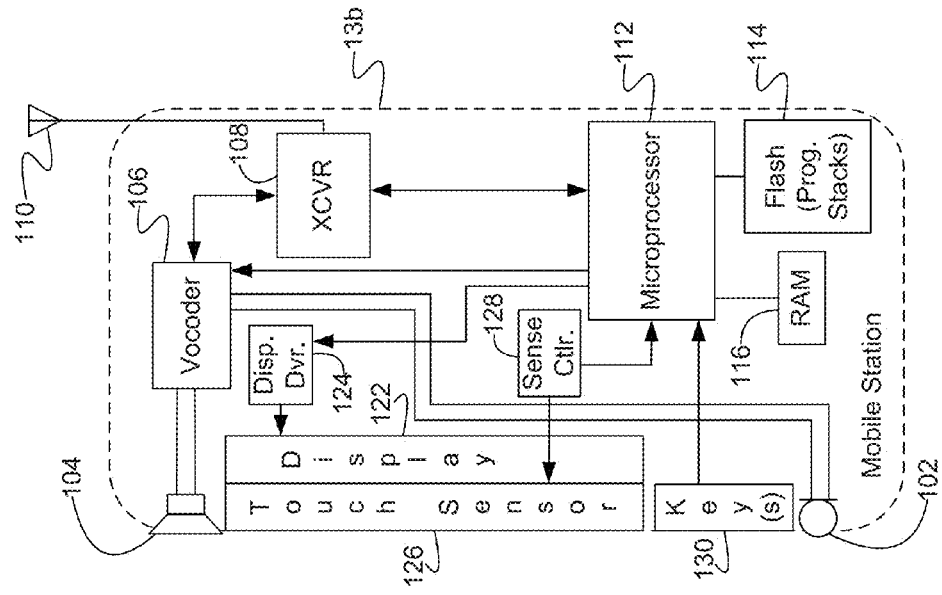
FIG. 7 is a high-level functional block diagram of an exemplary touch screen type mobile device that may utilize the rule configuration service through a network/system like that shown in FIG. 1.

For purposes of such a discussion, FIG. 7 provides a high-level functional block diagram of an exemplary touch screen type mobile device that may utilize the rule configuration service through a network/system like that shown in FIG. 1. FIG. 7 provides a block diagram illustration of an exemplary touch screen type mobile device 13b. Although possible configured somewhat differently, at least logically, a number of the elements of the exemplary touch screen type mobile device 13b are similar to the elements of mobile device 13a, and are identified by like reference numbers in FIG. 7. For example, the touch screen type mobile device 13b includes a microphone 102, speaker 104 and vocoder 106, for audio input and output functions, much like in the earlier example. The mobile device 13b also includes at least one digital transceiver (XCVR) 108, for digital wireless communications, although the handset 13b may include an additional digital or analog transceiver. The concepts discussed here encompass implementations of the mobile device 13b utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile device 13b, in that it controls all operations of the mobile device 13b in accord with programming that it executes, for all normal operations, and for operations involved in the rule configuration procedure under consideration here. In the example, the mobile device 13b includes flash type program memory 114, for storage of various program routines and mobile configuration settings. The mobile device 13b may also include a non-volatile random access memory (RAM) 116 for a working data processing memory. Of course, other storage devices or configurations may be added to or substituted for those in the example. Hence, outlined above, the mobile device 13b includes a processor, and programming stored in the flash memory 114 configures the processor so that the mobile device is capable of performing various desired functions, including in this case the functions involved in the technique for providing rule configuration service.

In the example of FIG. 7, the user interface elements included a display and a keypad. The mobile device 13b may have a limited number of key 130, but the user interface functions of the display and keypad are replaced by a touch screen display arrangement. At a high level, a touch screen display is a device that displays information to a user and can detect occurrence and location of a touch on the area of the display. The touch may be an actual touch of the display device with a finger, stylus or other object, although at least some touch screens can also sense when the object is in close proximity to the screen. Use of a touch screen display as part of the user interface allows a user to interact directly with the information presented on the display.

Hence, the exemplary mobile device 13b includes a display 122, which the microprocessor 112 controls via a display driver 124, to present visible outputs to the device user. The mobile device 13b also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile device 13b. The microphone 102 and speaker 104 may be used as additional user interface elements, for audio input and output, including with respect to some rule configuration related functions.

The structure and operation of the mobile devices 13a and 13b, as outlined above, were described by way of example, only. As shown by the above discussion, functions relating to the rule configuration service, via a graphical user interface of a mobile device may be implemented on computers connected for data communication via the components of a packet data network, operating as shown in FIG. 1. Although special purpose devices may be used, such devices also may be implemented using one or more hardware platforms intended to represent a general class of data processing device commonly used to run "server" programming so as to implement the rule configuration functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for rule configuration service. The software code is executable by the general-purpose computer that functions as the rule configuration platform and/or that functions as a user terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for rule configuration service, in essentially the manner performed in the implementations discussed and illustrated herein.

Figure 9:
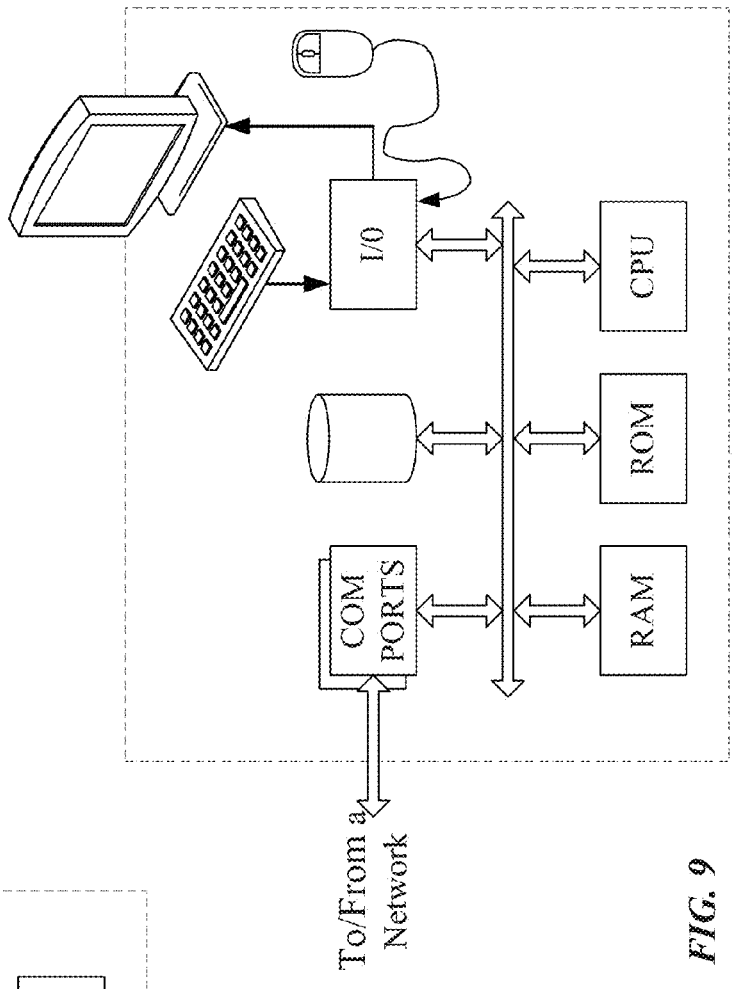
FIG. 9 is a simplified functional block diagram of an exemplary personal computer or terminal device.
Figure 8:
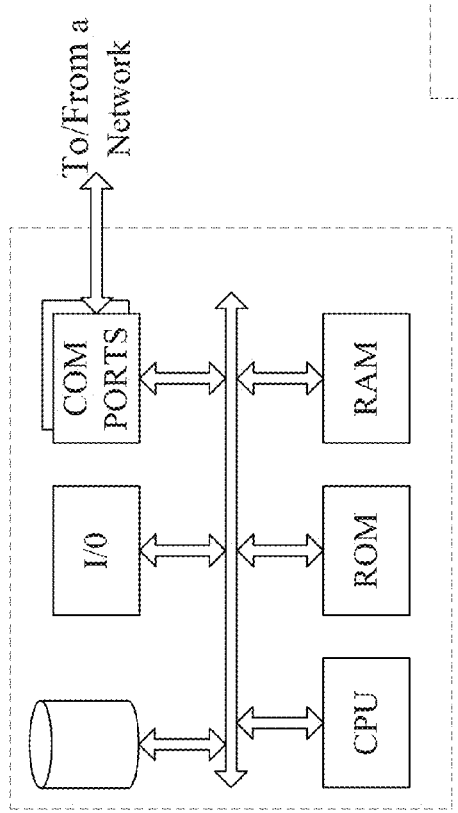
FIG. 8 is a simplified functional block diagram of an exemplary computer that may be configured as a host or server.

FIGS. 8 and 9 provide functional block diagram illustrations of general purpose computer hardware platforms. FIG.

8 illustrates a network or host computer platform, as may typically be used to implement a server. FIG. 9 depicts a computer with user interface elements, as may be used to implement a personal computer or other type of work station or terminal device, although the computer of FIG. 9 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 8). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of providing rule configuration services outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the rule configuration platform 103 into the computer platform of the application server 25 that will be the application server for the mobile devices 13a, and 13b or the user terminal 27. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the rule configuration service, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the above discussion primarily refers to processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

Many of the above described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions.

In this specification, the term "software" is meant to include firmware residing in read-only memory or applications stored in magnetic storage, which can be read into memory for processing by a processor. Also, in some implementations, multiple software operations can be implemented as sub-parts of a larger program while remaining distinct software operations. In some implementations, multiple software operations can also be implemented as separate programs. Finally, any combination of separate programs that together implement a software invention described herein is within the scope of the invention. In some implementations, the software programs, when installed to operate on one or more electronic systems, define one or more specific machine implementations that execute and perform the operations of the software programs.

A computer program (also known as a program, software, software application, script, application, or code) can be written in any form of programming language, including compiled or interpreted language, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of steps in the processes disclosed herein is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A system comprising a plurality of servers and a rule configuration platform, each of the plurality of servers including:
   one or more processors; and
   a memory for storing instructions which, when executed by the one or more processors, cause the one or more processors to:
   receive, from the rule configuration platform, a set of rules associated with a plurality of network resources accessible at one of the plurality of servers, the plurality of network resources including one of a website, a script, executable code, and a data file accessible at the one of the plurality of servers;
   store the set of rules in a data storage associated with the one of the plurality of servers;
   receive, from a first computing device, a URL that is a request to access a network resource included in the plurality of network resources, wherein the URL includes a plurality of parameters that direct the URL to a first data center associated with one of the plurality of servers;
   determine one or more rules associated with the network resource from the set of rules in the data storage;
   determine a mapping between the URL and each of the one or more rules;
   determine, based on the mapping between the URL and the one or more rules, that one or more of the plurality of parameters included in the URL need to be modified to conform with the one or more rules so as to direct the URL to a second data center that is associated with the one of the plurality of servers but that is different than the first data center, wherein the network resource is located at the second data center;

generate, in response to the determination that one or more of the plurality of parameters need to be modified, a modified URL;

provide, based on the modified URL, the first computing device with access to the network resource located at the second data center;

detect a modification to the network resource after the one or more processors provide the first computing device with access to the network resource located at the second data center, the modification to the network resource including a change to at least one of an access method of the network resource, an address of the network resource, and a server configuration of the network resource;

inform the rule configuration platform of the modification to the network resource; and receive, from the rule configuration platform, one or more updated rules that are updated based on the modification to the network resource, wherein by using the rule configuration platform the system increases the speed of implementing the set of rules associated with the plurality of network resources across the plurality of servers.

2. The system of claim 1, wherein the network resource is a World Wide Web resource, the one of the plurality of servers is a web server and the URL is for accessing the World Wide Web resource via the web server, and wherein the plurality of parameters comprise at least one of a domain name, an IP address, a network resource identifier, a port number, a query, or a combination thereof.

3. The system of claim 1, wherein the memory further stores instructions which, when executed by the one or more processors, cause the one or more processors to:

store the modified URL in a cache memory associated with the first computing device;

receive, from the first computing device, a second URL for accessing the network resource; and obtain, from the cache memory, the stored modified URL, wherein providing access to the network resource includes providing access to the network resource based on the stored modified URL.

4. The system of claim 1, wherein the memory further stores instructions which, when executed by the one or more processors, cause the one or more processors to:

determine a redirecting schedule associated with the one of the plurality of servers, wherein determining the one or more rules includes determining the one or more rules based on the redirecting schedule.

5. The system of claim 1, wherein to receive the set of rules, the memory further stores instructions which, when executed by the one or more processors, cause the one or more processors to automatically receive the set of rules, based on a predetermined timing schedule associated with the one of the plurality of servers.

6. The system of claim 1, wherein to receive the set of rules, the memory further stores instructions which, when executed by the one or more processors, cause the one or more processors to receive the set of rules, based on a predetermined timing schedule associated with the rule configuration platform.

7. The system of claim 1, wherein to receive the set of rules, the memory further stores instructions which, when executed by the one or more processors, cause the one or more processors to receive the set of rules based on receiving a notification from the rule configuration platform indicating that a new set of rules is available.

8. A method comprising:

receiving, at a first server and from a second server, a set of rules associated with a plurality of network resources accessible at the first server in order to simplify implementation of the set of rules at the first server, the plurality of network resources including one of a website, a script, executable code, and a data file accessible at the first server;

storing the set of rules in a data storage associated with the first server;

receiving, at the first server and from a first computing device, a URL that is a request to access a network resource included in the plurality of network resources, wherein the URL includes a plurality of parameters that direct the URL to a first data center associated with the first server;

determining, by the first server, one or more rules associated with the network resource from the set of rules in the data storage;

determining, by the first server, a mapping between the URL and each of the one or more rules;

determining, based on the mapping between the URL and the one or more rules, that one or more of the plurality of parameters included in the URL need to be modified to conform with the one or more rules so as to direct the URL to a second data center that is associated with the first server but that is different than the first data center, wherein the network resource is located at the second data center;

generating, by the first server in response to the determination that one or more of the plurality of parameters need to be modified, a modified URL based on the one or more matches;

providing, by the first server based on the modified URL, the first computing device with access to the network resource located at the second data center;

detecting, by the first server after the providing of the first computing device with access to the network resource located at the second data center, a modification to the network resource, the modification to the network resource including a change to at least one of an access method of the network resource, an address of the network resource, and a server configuration of the network resource;

informing, by the first server, the second server of the modification to the network resource; and receiving, at the first server and from the second server, one or more updated rules that are updated based on the modification to the network resource.

9. The method of claim 8, wherein the network resource is a World Wide Web resource, the first server is a web server and the URL is for accessing the World Wide Web resource via the web server, and wherein the plurality of parameters comprise at least one of a domain name, an IP address, a network resource identifier, a port number, a query, or a combination thereof.

10. The method of claim 8, further comprising:

storing, by the first server, the modified URL in a cache memory associated with the first computing device;

receiving, at the first server and from the first computing device, a second URL for accessing the network resource; and obtaining, by the first server and from the cache memory, the stored modified URL, wherein providing access to the network resource by the first server is based on the stored modified URL.

11. The method of claim 8, further comprising:
determining a redirecting schedule associated with the first server, wherein determining the one or more rules is based on the redirecting schedule.

12. The method of claim 8, wherein receiving the set of rules at the first server includes automatically receiving the set of rules at the first server, based on a predetermined timing schedule.

13. The method of claim 8, wherein receiving the set of rules at the first server is based on receiving a notification at the first server from the second server indicating that a new set of rules is available.

14. A method comprising:
receiving, at a server and from a computing device, a plurality of rule generation requests associated with a URL that is a request to access a network resource, the URL including a plurality of parameters that direct the URL to a first data center associated with the server;
receiving, at the server and from the computing device, credentials associated with a user of the first computing device;
if the credentials are valid, generating, by the server, a plurality of rules associated with the URL for the network resource based on the plurality of rule generation requests, and storing the plurality of rules in a rule repository associated with the server, the plurality of rules specifying that one or more of the plurality of parameters included in the URL need to be modified so as to direct the URL to a second data center that is associated with the server but that is different than the first data center, wherein the network resource is located at the second data center;
receiving at the server, from a first server, a request for one or more rules associated with URLs for a plurality of network resources accessible at the first server, the plurality of network resources including one of a website, a script, executable code, and a data file accessible at the first server;
searching the rule repository for the one or more rules;
if the one or more rules are found, providing the one or more rules to the first server, thereby increasing speed of implementation of the one or more rules at the first server;
receiving at the server, from the first server, a notification informing the server of a modification to the network resource located at the second data center, the modification to the network resource located at the second data center including a change to at least one of an access method of the network resource, an address of the network resource, and a server configuration of the network resource; and
providing, by the server to the first server based on the modification to the network resource, one or more updated rules associated with the network resource.

15. The method of claim 14, further comprising:
receiving, at the server and from a second computing device, a plurality of updates associated with the plurality of rules;
receiving, at the server and from the second computing device, second credentials associated with a user of the second computing device; and
if the second credentials are valid, updating, by the server, the plurality of rules in the rule repository based on the plurality of updates.

16. The method of claim 14, wherein the plurality of rules include server-specific rules and the plurality of updates include server-specific updates associated with the first server, the method further comprising:
updating, by the server, each of the plurality of server-specific rules in the rule repository based on the server-specific updates associated with that rule; and
storing, by the server, each of the updated plurality of rules in the rule repository.

17. The method of claim 14, further comprising:
prior to storing the plurality of rules in the rule repository, and prior to updating the plurality of rules in the rule repository, determining validity of the rules and validity of the updates based on a predefined rule format.

18. The method of claim 14, wherein the rule repository is a centralized memory accessible by the server, and by the first server.

* * * * *